July 27, 1954
D. JOHNSTON
2,684,617
SUBSOIL TOOL
Filed Sept. 21, 1951
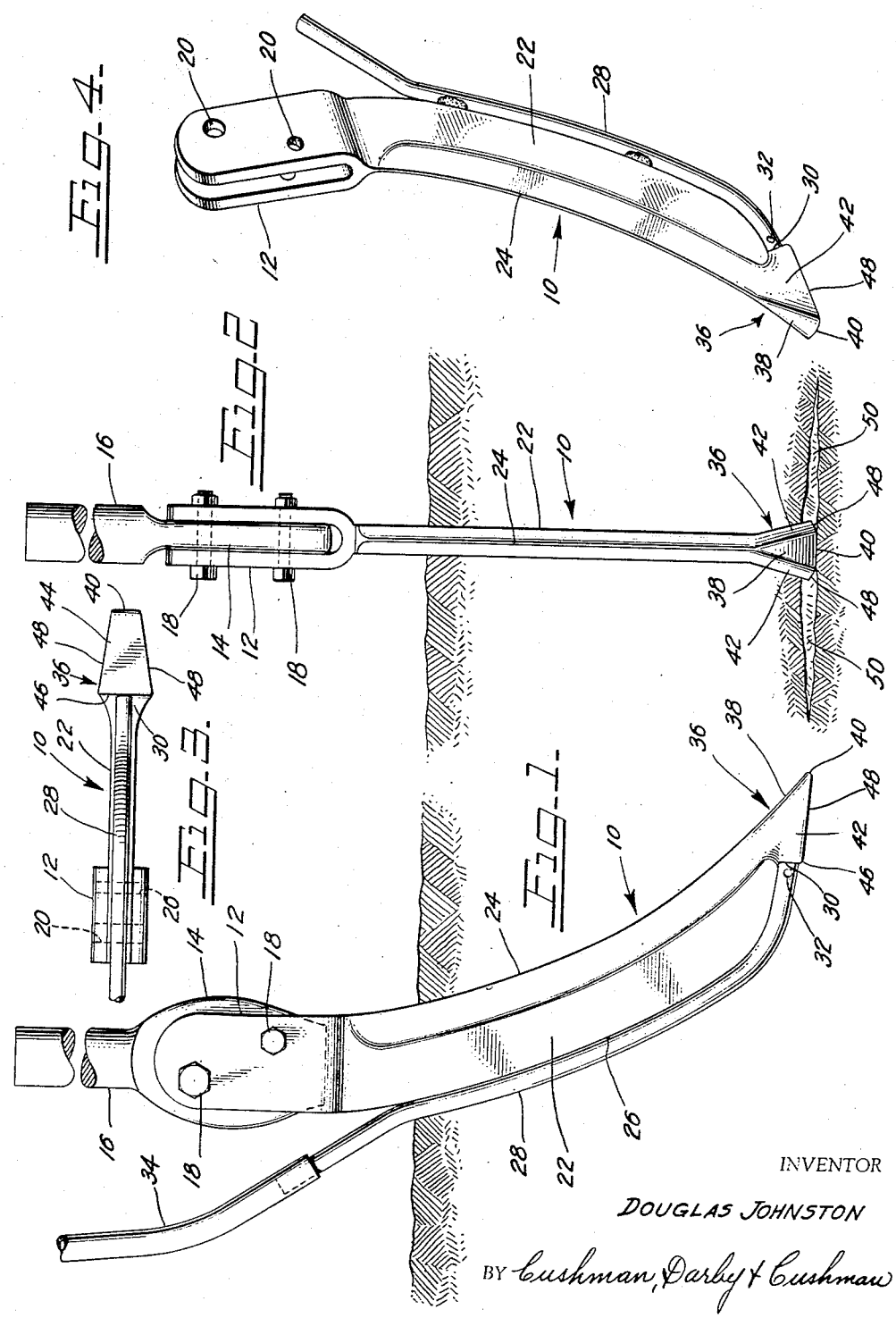
INVENTOR
DOUGLAS JOHNSTON
BY Cushman, Darby & Cushman
ATTORNEY Patented July 27, 1954

2,684,617

UNITED STATES PATENT OFFICE 2,684,617

SUBSOIL TOOL

Douglas Johnston, Huntsville, Ala., assignor to John Blue Company, Huntsville, Ala., a corporation of Alabama Application September 21, 1951, Serial No. 247,630

2 Claims. (Cl. 97—78)

This invention relates to agricultural implements and more particularly to fertilizer distributors for applying a pressurized, normally-gaseous liquid into the ground.

Fertilizer distributors of this type comprise cultivator-type implements having one or more subsoil tools in the form of thin cultivator-like teeth or blades which are drawn through the soil at a depth of from about 4 to about 6 inches. Each blade is provided with a tube, usually extending down the rearward edge thereof, for conducting liquid fertilizer, more specifically anhydrous ammonia, to the lower end of the blade for escape through suitable discharge ports into the adjacent soil. Such blades are usually detachably connected to a supporting shank that is secured to a lift-type cultivator drawbar. Blade-like tools of this nature, although generally satisfactory, present problems in their manufacture and have other drawbacks.

Applicator blades presently in use have a pointed end or foot, and in order to resist the extreme abrasion of the soil are usually provided with hard, wear-resistant inserts both along their forward sharp edge and at their point. An abrasion-resistant material frequently used for such inserts is Stellite, a relatively expensive alloy of cobalt, chromium, and tungsten. Additionally, the blades normally are coated with Stellite. Even with such expensive wear-resistant inserts, which also involve costly labor charges for welding them to the blade, it has been found in actual practice that, depending somewhat upon the nature of the soil, applicator blades of this type usually have a constant-use life of about only a day. At the end of this time, the pointed end of the blade will have substantially disintegrated under the abrasive action of the soil and the entire blade must be discarded. In fact, the Stellite inserts substantially peel back from the pointed end of the blade after its tip has worn away.

The liquid anhydrous ammonia applied into the ground by such applicator blades is normally maintained under pressure, so that upon release of such pressure during application, a large portion of the applied anhydrous ammonia reverts to the vaporous state. Although anhydrous ammonia is readily absorbable into the earth in either its liquid or gaseous form, the applied gaseous portions thereof tend to work up rather rapidly through the disturbed earth and escape into the atmosphere, to thereby be dissipated, without being absorbed into the ground. Hence, the conventional type of applicator blade is relatively thin in cross section in order to disturb the soil as little as possible during its passage therethrough. It has been found, however, that the soil in the furrow behind such blades is sufficiently loose or unpacked to permit the upward escape of the gaseous portions of the applied anhydrous ammonia too rapidly to enable absorption of all of such gaseous portions before dissipation into the atmosphere.

For operating reasons, it is desirable that applicator blades of the type under consideration have considerable "suction". The term "suction" refers to the downward component of the reaction force of the soil on the blade which tends to pull or hold the blade into the ground during its forward movement therethrough. The "suction" obtained by conventional pointed type applicator blades is relatively small.

It is, therefore, an object of this invention to provide an improved applicator blade or subsoil tool of the type described which has a greatly extended constant-use life, and will not wear out as rapidly as blades presently in use.

It is another object of this invention to provide an improved applicator blade, having a longer constant-use life, which is less expensive to manufacture than conventional applicator blades.

It is still another object of this invention to provide an applicator blade of the type described which has an improved sealing effect, that is, retention of the gaseous portion of the applied liquid within the ground for maximum absorption thereby.

It is still another object of this invention to provide an applicator blade of the type under consideration which has improved "suction".

It is a further object of this invention to provide an improved applicator blade that is simple in design, and consequently inexpensive to manufacture, for accomplishing the above objects.

Other objects and advantages of this invention will be apparent from the following description and the accompanying drawings, in which:

Figure 1 is a side elevational view of an applicator blade embodying this invention. The blade is shown connected to a supporting shank and in applicating position within the ground.

Figure 2 is a front elevational view of the blade shown in Figure 1.

Figure 3 is a bottom view of the blade shown in Figure 1.

Figure 4 is a perspective view of the blade shown in Figure 1.

Referring now to the drawings, there is shown an improved subsoil tool or applicator blade 10 embodying this invention. The upper portion 12 of the blade is bifurcated for receiving the flattened lower portion 14 of a supporting shank 16 which is adapted to be secured to a conventional lift-type drawbar (not shown). The bifurcated portion 12 of the blade 10 and the flat portion 14 of the shank 16 are secured together by a pair of spaced bolts 18 extending transversely through suitable bolt holes 20 in such portions. Extending downwardly and forwardly in a smooth curve from the bifurcated portion 12 is a thin blade-like intermediate section 22 having a concave sharp front edge 24 for facilitating the movement of the blade 10 through the soil without undue force.

Secured to the substantially flat rear edge 26 of the blade, as by welding, is a metal tube 28 that extends downwardly and terminates in a recessed portion 30 (later described) of the blade. The terminal end of the tube 28 is provided with lateral ports 32 for discharging anhydrous ammonia laterally into the soil at the lower end and immediately to the rear of the travelling blade 10. A flexible conduit 34 tightly telescoped over the upper or above-ground end of the tube 28 serves to feed anhydrous ammonia thereto from an appropriate source of supply, not shown.

The lower end of the blade 10 is provided with a foot portion 36 which achieves the desirable characteristics of the blade which are the purpose of this invention. As will be seen from an inspection of the drawings, the foot portion 36 has a progressively downwardly widened or triangular-shaped front surface 38 which constitutes an extension of the sharp forward edge 24 of the blade and terminates in a horizontally disposed substantially straight edge 40. Additionally, the side surfaces 42 of the foot portion 36 diverge or flare smoothly downwardly from the convergent side walls of the intermediate section 22 of the blade. The undersurface 44 of the foot portion 36 is substantially flat and, because of the configuration of the front and side surfaces 38 and 42, trapezoidal in shape, having the rear edge 46 thereof substantially parallel to and of slightly greater length than the front edge 40 so that the side edges 48 of the flattened undersurface diverge slightly rearwardly, as shown best in Figure 3. Preferably, the flattened undersurface 44 of the blade is inclined rearwardly slightly upwardly from the horizontal during the normal position of the blade 10 when travelling through the ground. The configuration of the foot portion 36 of the blade may be termed a chisel-like point, as contrasted to the knife point of a conventional blade.

The rearward edge 26 of the intermediate section 22 of the blade is curved somewhat abruptly forwardly, immediately above the foot portion 36, to provide the upward offset 30 immediately to the rear of the flattened undersurface 44 of the blade. It is in this upwardly offset portion 30 of the blade that the discharge end of the feed tube 28 terminates, so that the feed tube is completely protected against the abrasive action of the soil while the blade is travelling therethrough.

It has been found in actual practice that the configuration of the foot portion 36 of the improved blade greatly extends the operating life of the blade 10, even without the use of wear-resistant alloy inserts. The life of such blade 10 is, in fact, two or three times greater than that of conventional blades. Preferably, the intermediate section 22 and the foot portion 36 of the improved blade are made of forged steel and subsequently case hardened to resist the abrasive action of the soil thereon. It will thus be seen that the fabrication of a blade of this nature is much less expensive than that of a conventional blade which must have expensive inserts of wear-resistant metal, that require the separate manufacturing operation of welding such inserts to the blade proper. The mere case hardening of a blade of conventional configuration, without alloy inserts, is insufficient to provide a practical operational life.

It also has been found that the chisel point configuration of the foot portion 36 of the blade not only increases the "suction" of the blade, but also facilitates the absorption into the soil of the gaseous portions of the applied anhydrous ammonia. This latter feature is accomplished by the action of the foot portion 36 on the subsoil while travelling through the ground. As will be seen from Figure 2, it is believed that the inclined front surface 38 of the foot portion 36, aided by the downwardly diverging side surfaces 42 thereof, produces lateral cracks 50 in the subsoil into which the anhydrous ammonia is discharged for rapid absorption before passage upwardly through the loose earth behind the travelling blade 10 for escape into the atmosphere. In some instances, depending upon the nature of the soil, it is thought that the lateral cracks 50 produced by the foot portion 36 of the blade close after passage of the blade and thereby serve to trap the applied anhydrous ammonia therein. Consequently, the improved blade 10 exhibits a superior sealing effect, i. e., soil retention of the gaseous portions of the applied anhydrous ammonia, as contrasted to conventional applicator blades of this nature.

It will be understood, however, that the above description of the action of the foot portion 36 of the blade when travelling through the soil is theoretical only and that the improved results achieved by this invention are not confined to allegations of theoretical operation.

It will thus be seen that the objects of this invention have been fully and effectively accomplished by an easily and inexpensively constructed applicator blade which exhibits superior characteristics over blades in use heretofore. It will be realized, however, that various changes may be made in the specific embodiment used to disclose this invention without departing from the principles of the invention. Therefore, this invention includes all modifications which are encompassed by the spirit and scope of the following claims.

I claim:

1. A blade-like subsoil tool for use in applying a normally-gaseous pressurized liquid into the soil, said tool being adapted to be supported in a generally-upright position for penetration of and movement through the soil and comprising: a thin intermediate portion provided with a downwardly and forwardly-sloping relatively-sharp front edge; and a foot portion joined to the lower end of said intermediate portion and having a horizontal substantially-straight relatively-sharp front chisel edge and a downwardly and forwardly-sloping substantially-flat front face with side edges that progressively downwardly diverge from the lower end of said intermediate portion front edge to said chisel edge, said foot portion also having downwardly and rearwardly-diverging substantially-flat side faces and a flat underface, said side faces having front edges coincident with said front face side edges.

2. The structure defined in claim 1 in which the flat underface of the foot portion is generally trapezoidal with rearwardly-diverging side edges.

References Cited in the file of this patent

UNITED STATES PATENTS

| Number | Name | Date |
|---|---|---|
| 27,324 | Watson | Feb. 28, 1860 |
| 32,459 | Beall | June 4, 1861 |
| 117,662 | Miner | Aug. 1, 1871 |
| 131,391 | Brinly | Sept. 17, 1872 |
| 144,487 | Turner et al. | Nov. 11, 1873 |
| 190,096 | Swift | Apr. 24, 1877 |
| 464,124 | Thomas | Dec. 1, 1891 |
| 1,765,185 | Umbarger | June 17, 1930 |
| 2,269,724 | Linkogel | Jan. 13, 1942 |
| 2,323,460 | Domrese et al. | July 6, 1943 |
| 2,619,054 | Bell | Nov. 25, 1952 |
| 2,631,389 | Stovall et al. | Mar. 17, 1953 |

FOREIGN PATENTS

| Number | Country | Date |
|---|---|---|
| 49,965 | Denmark | Mar. 4, 1935 |
| 55,354 | Denmark | Oct. 17, 1938 |
| 148,346 | France | Apr. 14, 1882 |
| 149,325 | France | June 5, 1882 |

OTHER REFERENCES

Agricultural Engineering (pages 394–396), September 1947.